Nov. 27, 1962    E. M. CALKINS    3,065,938
TELESCOPING SECTIONAL AIRPLANE WING
Filed May 25, 1960    2 Sheets-Sheet 1
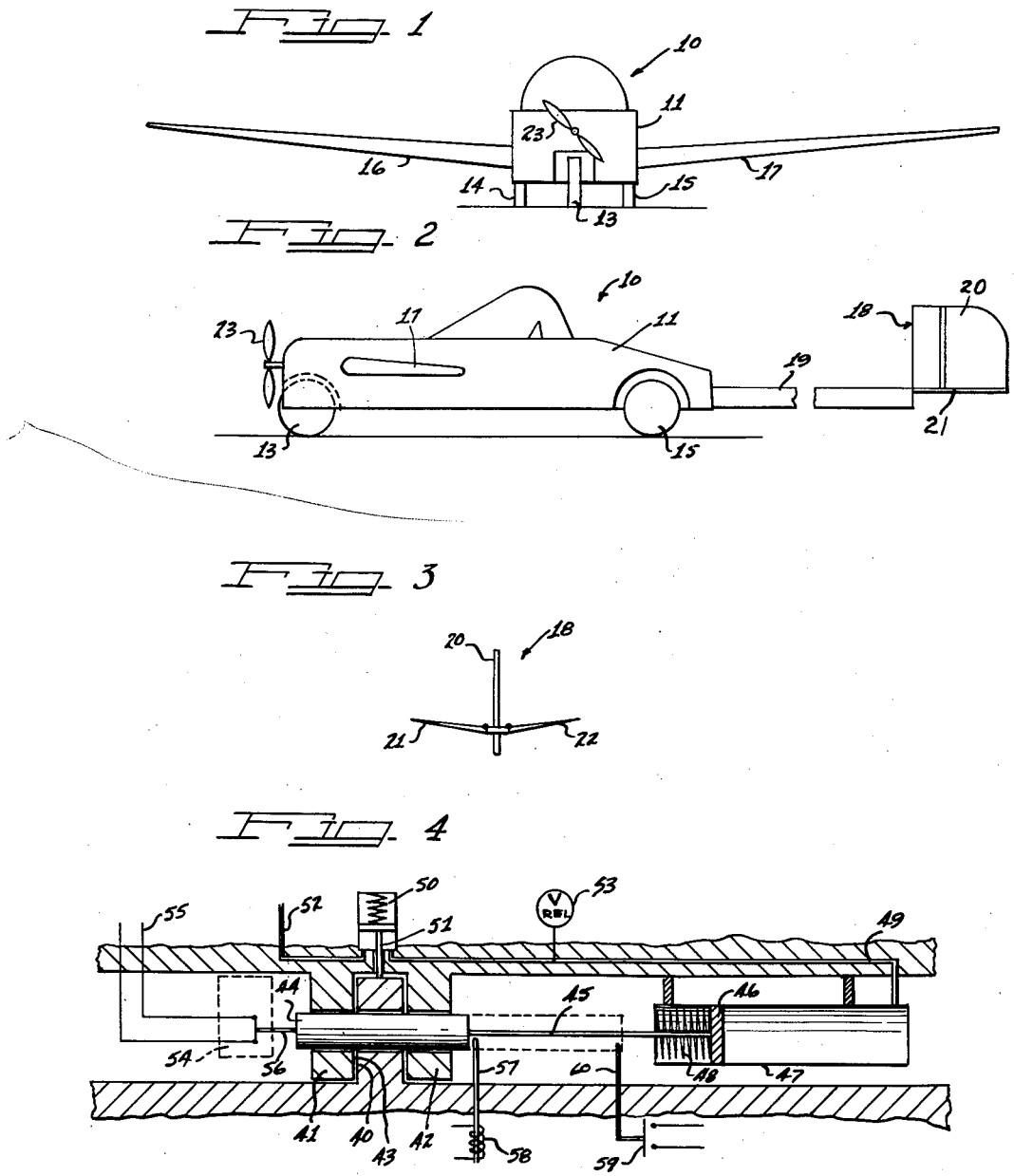
Inventor
Eugene M. Calkins

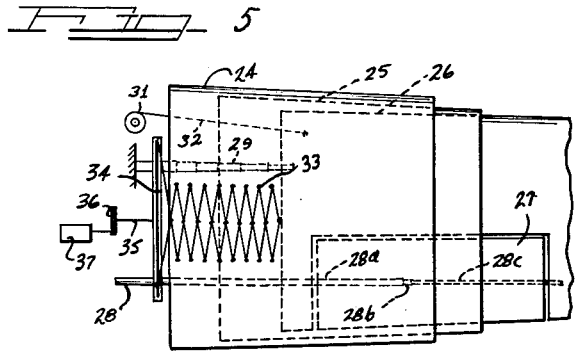
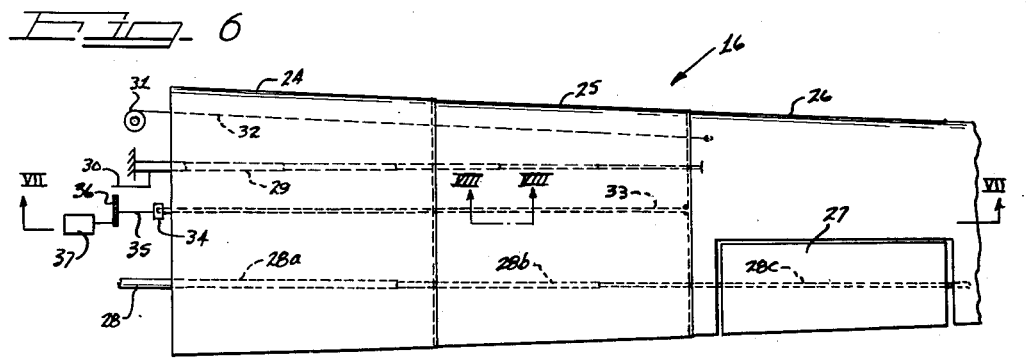
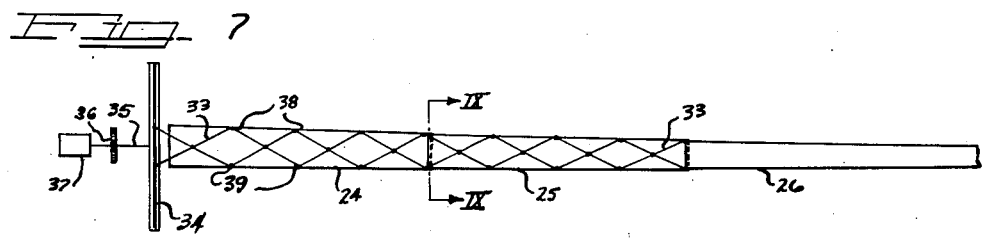
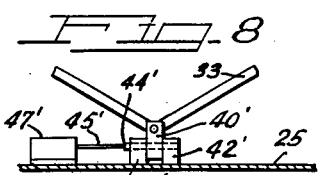
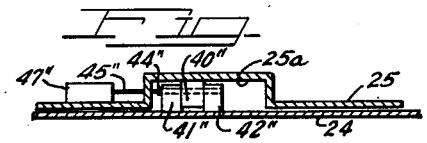
Eugene M. Calkins

United States Patent Office 3,065,938
Patented Nov. 27, 1962

3,065,938
TELESCOPING SECTIONAL AIRPLANE WING
Eugene M. Calkins, 8119 Knowles Lane, El Paso, Tex.
Filed May 25, 1960, Ser. No. 31,708
6 Claims. (Cl. 244—46)

The present invention relates to an improved vehicle capable of travelling on the ground or in the air and particularly to an improved aircraft wing for the vehicle which is retractable for ground travel and extendible for air travel.

The invention contemplates the provision of a vehicle having a body supported on wheels for use as an automobile for ground travel. The body is also provided with a tail section and with retractable wings which can be extended so that the vehicle may be used as an airplane. The wings include a plurality of hollow wing sections in telescopic relationship for movement between retracted ground position and extended flight position and are provided with power means for extending and retracting the sections, preferably in the form of a hydraulic jack for extending the sections and a winch and capable for drawing the sections inwardly to retracted ground position. The hollow wing sections are provided with locking means in the form of locking pins which are operated by fluid pressure controlled by a valve that is automatically actuated when the wings reach extended position, and an indicator shows when the sections are locked. An important feature resides in the mechanism for rigidifying the aircraft wing in extended position and this includes a pantograph linkage which rotates to a horizontal position for being retracted with the wing and which also can be extended with the wing. In the extended position the pantograph linkage rotates to vertical position and the ends of the members of the link lock to the upper and lower surfaces of the wing sections for rigidifying the wing.

An object of the present invention is to provide an improved airplane wing construction capable of being retracted on the ground and capable of being extended to form a rigid wing for flight.

Another object of the invention is to provide an extensible and retractable multi-section airplane wing with improved mechanism for extending and retracting the wing and for locking sections of the wing in extended position.

Another object of the invention is to provide an improved extensible airplane wing with an extensible pantograph framework within the wing for locking to the wing in extended position and forming a rigid wing unit.

Other objects and advantages will become more apparent with the teaching of the principles of the invention in connection with the disclosure of the preferred embodiment thereof in the specification, claims and drawings, in which:

FIGURE 1 is a front elevational view of a vehicle capable of flight and capable of ground travel embodying the principles of the present invention;

FIGURE 2 is a side elevational view of the vehicle of FIGURE 1;

FIGURE 3 is a rear elevational view of the tail section of the vehicle;

FIGURE 4 is a schematic illustration of a mechanism for locking sections of the wing and other parts of the vehicle in operative position;

FIGURE 5 is a plan view showing a portion of one of the wings with the sections in retracted telescoped position;

FIGURE 6 is a plan view of the wing of FIGURE 5 showing the sections in extended position;

FIGURE 7 is a sectional view taken substantially along line VII—VII of FIGURE 6, shown in somewhat schematic form;

FIGURE 8 is a vertical sectional view taken substantially along line VIII—VIII of FIGURE 6; and FIGURE 9 is a vertical sectional view taken substantially along line IX—IX of FIGURE 7.

As shown on the drawings:

As shown in FIGURES 1, 2 and 3, a vehicle 10 is adapted for both ground and air travel and incorporates a body 11 provided with the usual cockpit for a pilot or an operator. The body is provided with tricycle arranged landing gear in the form of a front wheel 13 and rear wheels 14 and 15 and the wheels also serve as a means of making the body ambulant on the ground.

Mounted on the sides of the body are retractable wings 16 and 17 which utilize mechanism shown in FIGURES 4 through 7 for retracting the wings for ground operation or for extending the wings for flight.

Mounted at the rear of the body is a tail assembly 18 on a support 19 which is adapted for moving the tail assembly into the body for ground travel. The support 19, for example, can be arranged to telescope into the body 11. As shown in FIGURE 3 the tail assembly may include a vertical rudder 20 with side members 21 and 22 which can be collapsed to a vertical position. Suitable locks are provided for locking the elements in operative position for flight, such as the lock shown in detail in FIGURE 4. At the front of the vehicle is a propeller 23 driven by an engine in the vehicle for flight.

As illustrated in FIGURES 5 and 6, each of the retractable aircraft wings includes a plurality of hollow wing sections 24, 25 and 26 in telescopic relationship. The wing sections are shown in retracted position for ground travel in FIGURE 5, and are shown in extended position for flight, in FIGURE 6. The sections are formed hollow of suitable lightweight material such as aluminum and are fitted so that they will have smooth telescopic movement with respect to each other.

Section 26 is shown provided with an aileron 27 mounted on a suitable pivotal support. The aileron is controlled by a shaft 28 which is formed in a plurality of telescopic sections. Each section is connected to each other for driving the shaft in rotation from the body of the vehicle, and section 28a may be square in cross section and be telescoped into section 28b. Similarly, the outer surface of 28b may be square and telescoped into the section 28c. Other cross sectional arrangements may be employed and the shaft may be keyed or splined.

Power means are employed for extending and retracting the wing sections and a fluid operated jack 29 may be used, formed in telescopic sections and mounted on the vehicle body and connected to the outer wing section for moving it outwardly. A suitable fluid supply line 30 is provided and the jack may be operated by the air pressure available or by hydraulic fluid.

For retracting the wing a winch 31 is shown having a cable 32 connected to the wing section 26. For convenience air pressure may be employed for operating the various units and the winch 31 may be driven by a pneumatic motor.

To rigidify the wing in extended flight position, a lazy-tongs or pantograph linkage 33 is provided within the hollow wing sections. The pantograph 33 moves between a retracted position, as shown in FIGURE 5 and an extended position, as shown in FIGURES 6 and 7, these positions corresponding with the retracted and extended positions of the wing sections. When the wing sections are extended, the pantograph linkage 33, in its horizontal position, is expanded to extended position. It is then rotated about its longitudinal axis through 90° to a vertical position as shown in FIGURE 7. Rotation may be accomplished such as by a shaft 35 connected to a sliding base support 34 for the pantograph linkage. The shaft is rotated by gears driven by a motor 37 or other suitable means.

When the pantograph 33 is rotated to a vertical position, the ends of the elements are locked to the upper surface of the wing sections and to the lower surface of the wing sections to provide a rigid frame support. The upper members are locked at 38 and the lower members at 39 by a suitable means, such as by providing openings in the members of the pantograph linkage and fittings on the inner surface of the wing sections with pins passing through the openings. A locking mechanism such as that illustrated in FIGURE 4 may be employed. While the locking mechanism of FIGURE 4 is illustrated generally as used between wing sections, it will be appreciated by those skilled in the art the same locking mechanism may be employed for locking the ends of the pantograph elements to the inner surface of the wing sections.

The locking mechanism of FIGURE 4 incorporates a tongue 40 which is inserted into a recess 43 between projections 41 and 42. The tongue 40 is positioned on one relatively movable member and the projections 41 and 42 on another relatively movable member and the movable members, for example, may be adjacent wing sections such as 24 and 25 and locking mechanisms such as shown in FIGURE 4 are provided between each of the wing sections. Similarly, locking mechanisms of this nature are also provided at the ends of each of the members of the pantograph linkage 33 and are also provided for the tail members 21 and 22.

The tongue 40 and the projections 41 and 42 are provided with openings that are in alignment in the position shown in FIGURE 4 to receive a locking pin 44. The pin is operated by a piston rod 45 connected to a piston or plunger 46 slidable in a pneumatic cylinder 47. Fluid pressure in the lower end of the cylinder 47 moves the piston 46 to insert the locking pin 44, and it is withdrawn from locking position by a coil compression spring 48 within the upper end of the cylinder 47, the spring being operative when the pressure is released from the lower end of the cylinder 47.

Fluid pressure is directed to the cylinder through a fluid pressure line 49 by a control valve 50. The valve is operated by a valve actuator stem 51 which is positioned to be engaged by the tongue 40 when it is in position in the recess 43. When the valve 50 is actuated, pressurized fluid from an air supply pressure line 52 is directed into the pneumatic cylinder. The cylinder 47 and piston 46 thereby act as a drive for moving the pin 44 to locked position. The valve 50 will remain open as long as the tongue is in place, and the pin is removed by opening a relief valve 53 also connected to the line 49. This relieves the pressure in the cylinder 47 permitting the spring 48 to withdraw the pin. A safety lock is provided, having a bolt 57 which blocks withdrawal of the pin 44 from locked position. The bolt is shown as being electrically withdrawn by energizing a coil 58 in order to withdraw the pin 44.

An indicator is provided operated by an indicator switch 54 which closes the circuit through an electrical line 55 leading to an indicator, which may take the form of a light on the instrument panel of the vehicle. The switch is operated by a switch actuator 56 which is engaged by the locking pin 44 when it is in locked position. The switch actuator 56 is released when the pin 44 is moved out of locked position so that the operator of the vehicle will always know when the parts of the vehicle are locked in operating position. Another indicating switch 59 is actuated by an actuator 60 to light a light on the vehicle instrument panel and show when the pin 44 is in unlocked position. As will be appreciated by those skilled in the art in some arrangements it may be desirable to have the spring 48 arranged to move the pin 44 to locked position, and move the pin to unlocked position by air pressure.

As will be recognized by those skilled in the art, the tongue 40 and the fingers 41 and 42 may be secured to adjoining parts in any convenient manner, and may, for example, be placed on the inner surface of the wing sections with grooves formed in adjacent sections to accommodate sliding of the sections. Also, although the preferred structure is shown, other locking devices may be employed.

FIGURE 8 illustrates the locking mechanism as used for locking the joints of the pantograph mechanism to the wing sections. On the inner surface of the wing section 25 are mounted lugs or projections 41' and 42' and these are spaced to receive a tongue 40' mounted at the joint of the pantograph 33. The space between the projections 41' and 42' faces fore and aft of the plane so that when the pantograph linkage is rotated the tongue 40' will move between the projections. When the tongue is in position, a piston rod 45' operated by a piston in a cylinder 47' mounted on the inner surface of the wing section 25 will move the locking pin 44' into locking position through holes in the projections 41' and 42' and the tongue 40' thus securely locking the pantograph linkage to the wing section. The outer wing section 26 which has to slide within the wing section 25 will have a small recessed groove so that it can slide over the cylinder 47' and the projections 41' and 42', in the fashion illustrated by the mechanism of FIGURE 9.

FIGURE 9 illustrates the position of the locking mechanisms for securely locking the wing sections to each other. The wing section 25 is shown with a recess 25a which enables it to slide over projections 41" and 42" and projections and cylinders similar to those shown in FIGURE 8 for locking the pantograph to the wing section 24.

The wing section 24 has the projections 41" and 42" which receive between them a tongue 40" on the wing section 25. When the wing sections are extended, the tongue 40" is between the projections and a locking pin 44" is moved to locking position by a piston rod 45" operated by a piston within a cylinder 47", which is mounted on the inner surface of the wing section 25. The cylinder 47" could of course be mounted on the wing section 24 positioned to be accommodated by the recess 25a. This recess is sufficiently shallow so as not to substantially adversely affect the air lift characteristics of the wing sections and the locking mechanisms can be made relatively small yet be strong so as to rigidly lock the wing sections and to lock the pantograph linkage to the wing sections.

In operation, the operator seated in the vehicle body 11 will have the wings 16 and 17 and the tail 18 retracted for use of the vehicle as an automobile. For flight, the tail 18 is extended and the wings are moved to their extended flight position. This is accomplished by admitting fluid such as air under pressure to the jack 29, FIGURE 6. The sections of the wing are automatically locked when fully extended by the mechanism of FIGURE 4 due to the tongue 40 operating the air valve 50 to cause the locking pin 44 to be inserted. The pantograph linkage 33 is extended, rotated to vertical position, and the ends of the member are locked at 38 to the upper surface of the wing sections and at 39 to the lower surface of the wing sections. For retracting the wings the reverse steps are taken and the winch 31 is operated to cause the cable 32, FIGURE 6, to retract the telescopic wing sections 24, 25 and 26.

The wing sections will also incorporate running lights, not shown, which will be built into the sections with electrical cables within the hollow wings for the lights. The wing sections will also be provided with suitable bearings and supports for the various elements to prevent vibration, and, for example, bearings will be provided for shaft 28 for operating the aileron.

The wing sections will have a suitable cross section of conventional design to give the desired lift to the aircraft and the wing will be tapered with the large end next to the body of the vehicle thus accommodating strength requirements and the telescopic relationship of the wing sections. A suitable number of sections will be provided for convenience and for obtaining the desired wing length. It is contemplated that the wing sections in their retracted ground position may be provided with a mechanism for moving them into and out of the body in certain instances to allow for larger wing sections. They also may be arranged to retract one above the other thereby also accommodating longer wing sections.

Suitable electrical lines and air supply lines will be provided within the hollow wing sections for the locks and operating mechanism, as will be appreciated by those skilled in the art, and these have been omitted from the drawings for convenience of illustration.

The cable for retracting the wing sections to retracted ground position may be operated by a single power drum mounted in the body controlling the cable for both wing sections. The retracting cable is located in a convenient position within the wing sections and it may be located within the pneumatic telescoping jack 29 for space conservation and convenience of attachment of fittings.

It is also contemplated that the pneumatic operating mechanism for the locking pins, as shown in FIGURE 4, may be replaced by electrical operators such as solenoids.

While the wings are shown as provided with a single pantograph linkage, as required for strength additional linkages may be provided across the wing to provide the strength requirements.

Thus it will be seen that I have provided an improved vehicle employing a retractable aircraft wing which meets the objectives and advantages hereinabove set forth. The mechanism is safe and reliable in operation. It provides a wing structure which is capable of obtaining the strength requirements for flight conditions and yet which can be withdrawn to a retracted position for ground use by simple mechanism without time consuming disassembly or mechanical alteration.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A retractable aircraft wing comprising a plurality of hollow wing sections in telescopic relationship for movement between an extended flight position and a retracted ground position, power means for extending and retracting said sections between said positions, a pantograph linkage within said wing sections movable between a retracted position and an extended position corresponding to the positions of said wing sections, means for rotating said linkage about its longitudinal axis from a first horizontal position corresponding to said retracted position and a vertical position corresponding to said extended position, and means for locking the ends of said members of said linkage to the top and bottom of said wing sections in the extended position of the wing sections to rigidify the wing.

2. A retractable aircraft wing comprising a plurality of hollow wing sections in telescopic relationship for movement between an extended flight position and a retracted ground position, a fluid operated telescopic jack extending horizontally in the wing sections for projecting the sections to said extended flight position, a winch means having a cable connected to pull said wing sections to said retracted position, a locking means between each of the sections including an axially movable locking pin, a fluid operated drive for moving said pin to locked position, a valve connected to said drive for controlling a supply of pressurized fluid to said drive, a valve actuator on at least one of said wing sections for operating said drive when the sections are extended, a pantograph linkage within said wing sections movable between a retracted position and an extended position, means for rotating said linkage about its longitudinal axis from a horizontal position corresponding to the retracted position of the linkage and a vertical position corresponding to said extended position of the linkage, and means for locking the ends of the members of said linkage to the top and bottom of the wing sections in vertical extended position to rigidify the wing.

3. A ground and air vehicle comprising a body, wheels for supporting the body, a plurality of hollow wing sections mounted on the body and being arranged in telescopic relationship for movement between an extended flight position and a retracted ground position, power means for extending and retracting said sections between said positions, locking means between each of the sections for holding the sections in said extended flight position, a pantograph linkage within said wing sections movable between a retracted position and an extended position corresponding to the positions of the wing sections, means for rotating said linkage about its longitudinal axis from a horizontal position corresponding to said retracted position and a vertical position corresponding to said extended position, and means for locking the ends of the members of said linkage to the top and bottom of said wing sections in said extended position to rigidify the wing on the body.

4. A vehicle adapted for movement both on the ground and in the air comprising a body, wheels supporting the body providing conveying support for the body during ground travel and for landing after travel in the air, a tail projecting from behind the vehicle for guiding it in the air, hollow rectractable wings having an oblong cross sectional shape for providing a lifting characteristic and projecting from the sides of the body having hollow telescoping sections for movement between an extended position for a flight of the vehicle and a retracted position for movement of the vehicle on the ground, and a pantograph linkage within the wing rotatably mounted for rotation about its horizontal axis between a vertical position for supporting engagement with the inside of the wings wherein the wings will be vertically supported and a horizontal position wherein the pantograph may be axially contracted for retracting the wings for use of the vehicle on the ground.

5. A retractable aircraft wing comprising a plurality of hollow wing sections in telescopic relationship for movement between an extended flight position and a retracted ground position, power means for extending and retracting said sections between said positions, a pantograph linkage within said wing sections movable between a retracted position and an extended position and having joints between the ends of links thereof, and means for locking the joints at the ends of the links of said pantograph linkage to the wing sections in the extended position of the wing sections and the linkage to rigidify the wing.

6. A retractable aircraft wing comprising a plurality of hollow wing sections in telescopic relationship for movement bewteen an extended flight position and a retracted ground position, power means for extending and retracting said sections between said positions, a locking means between each of the sections including an axially movable locking pin, a fluid operated drive for moving said pin to locked position, a valve connected to said drive for controlling a supply of pressurized fluid to the drive, and a valve actuator on at least one of said wing sections operated by an adjacent wing section when said sections are in said extended position for operating said drive.

References Cited in the file of this patent

UNITED STATES PATENTS

| | | |
|---|---|---|
| 1,653,903 | Hall | Dec. 27, 1927 |
| 2,533,429 | Carpenter | Dec. 12, 1950 |
| 2,713,393 | Isacco | July 19, 1955 |
| 2,719,682 | Handel | Oct. 4, 1955 |
| 2,743,072 | Emmi | Apr. 24, 1956 |